Dec. 27, 1938.   A. C. GRANT   2,141,244
CONTROL SYSTEM
Filed Nov. 19, 1934   3 Sheets-Sheet 1

Fig.1

INVENTOR
ARTHUR C. GRANT
BY Paul, Paul & Moore
ATTORNEY

Dec. 27, 1938.　　　　A. C. GRANT　　　　2,141,244
CONTROL SYSTEM
Filed Nov. 19, 1934　　　　3 Sheets-Sheet 2

INVENTOR
ARTHUR C. GRANT
BY Paul, Paul H Moore
ATTORNEY

Dec. 27, 1938.  A. C. GRANT  2,141,244
CONTROL SYSTEM
Filed Nov. 19, 1934  3 Sheets-Sheet 3

INVENTOR
ARTHUR C. GRANT
BY Paul, Paul & Moore
ATTORNEY

Patented Dec. 27, 1938

2,141,244

UNITED STATES PATENT OFFICE 2,141,244

CONTROL SYSTEM

Arthur C. Grant, St. Paul, Minn., assignor to Minneapolis-Honeywell Regulator Company, Minneapolis, Minn., a corporation of Delaware Application November 19, 1934, Serial No. 753,783

27 Claims. (Cl. 236—9)

The present invention relates to an improved automatic control system having particular utility in connection with the control of heating devices but also having utility for controlling any condition or force changing device.

One of the objects of the invention is the provision of a control system in which a condition or force changing device is operated intermittently under the control of mechanism actuated in response to changes in the value of a condition or force, preferably produced directly by the condition or force changing device, as distinguished from mechanism which responds to actual values of the condition or force when some other condition or force is such as normally to require operation of the condition or force changing device.

Another object of the invention is the provision of a control system for controlling a condition or force changing device in response to changes in the value of a condition or force produced by the condition or force changing device or in response to changes in the effectiveness of the condition or force changing device, when the value of some other condition or force is intermediate; and varying the operation of the condition or force changing device when the value of said other condition or force rises above or falls below said intermediate value.

A further object of the invention is the provision of an automatic control system for controlling a condition or force changing device in which there is provided mechanism responsive to changes in a condition of the condition or force changing device or responsive to changes in the effectiveness thereof, as distinguished from responsiveness to the actual value of the condition or force or its effectiveness, for gradually varying the operation of the condition or force changing device; together with means responsive to some other condition or force for permitting such operation by said mechanism when the value of such other condition or force is at one value and for preventing such operation when said other condition or force is at some other value. Also, preferably, the arrangement is such as to cause operation of the condition or force changing device when said other condition or force is at still another value.

In the preferred form of the invention, the mechanism responsive to changes in the condition of the condition or force changing device produces modulating control, whereas the means responsive to said other condition causes minimum operation of the condition or force changing device when said other condition is at one value, causes maximum operation of said condition or force changing device when the value of said other condition is at a second value, and permits such modulation of said condition or force changing device when the value of said other condition is intermediate said two values.

A further object of the invention is the provision of an electrical system of automatic control including a condition or force responsive element which closes first and second switches upon rise and fall in a condition or force to predetermined values, both said switches being open for intermediate values of said condition or force, the arrangement being such that a condition or force changing device is operated at maximum capacity upon closure of one of said switches and is operated at minimum capacity upon closure of the other of said switches, and there being circuit controlling means responsive to changes in the effectiveness of the condition or force changing device or responsive to changes in some condition or force produced by the condition or force changing device for controlling the condition or force changing device when both said switches are open.

The means responsive to changes in the effectiveness of the condition or force changing device or responsive to changes in some condition or force produced by the condition or force changing device preferably takes the form of a variable resistance means but may also take the form of a pair of switches, one of which is closed upon an increase in such effectiveness or condition or force, and the other of which closes upon decrease thereof. The provision of these means also constitutes objects of the invention.

Another object of the invention is the provision of a pair of oppositely acting electrical devices for controlling a condition changing device, together with a pair of current controlling mechanisms for changing the respective energizations of said devices, one of said mechanisms responding to changes in one condition, whereas the other of said mechanisms responds to actual values of another condition. One of said current controlling mechanisms preferably takes the form of a double circuit switching mechanism, while the other current controlling mechanism preferably takes the form of a variable resistance means, although it too may well be a double circuit switching mechanism.

Another object of the invention is the provision of a control system in which switching mechanism controls electrical means for dominating the operation of a condition or force changing device, the switching mechanism being controlled by electrical means which are normally balanced electrically, and which are unbalanced by a pair of current controlling mechanisms that are responsive to different conditions, one of the current controlling mechanisms preferably responding to changes in the value of one of said conditions rather than responding to the actual value of said condition, together with balancing means controlled by said electrical means for rebalancing the energization of said devices.

Another object of the invention is the provision of an improved current controlling mechanism in which a single condition responsive actuator operates one current controlling device at a predetermined value of said condition and operates another current controlling device as a result of changes in the value of said condition but independently of the actual value thereof.

Further objects of the invention will be found in the drawings, detailed description, and claims.

For a more complete understanding of the invention, reference may be had to the following description and accompanying drawings which show two of the many forms which the invention may take, and in which.

Figure 1:
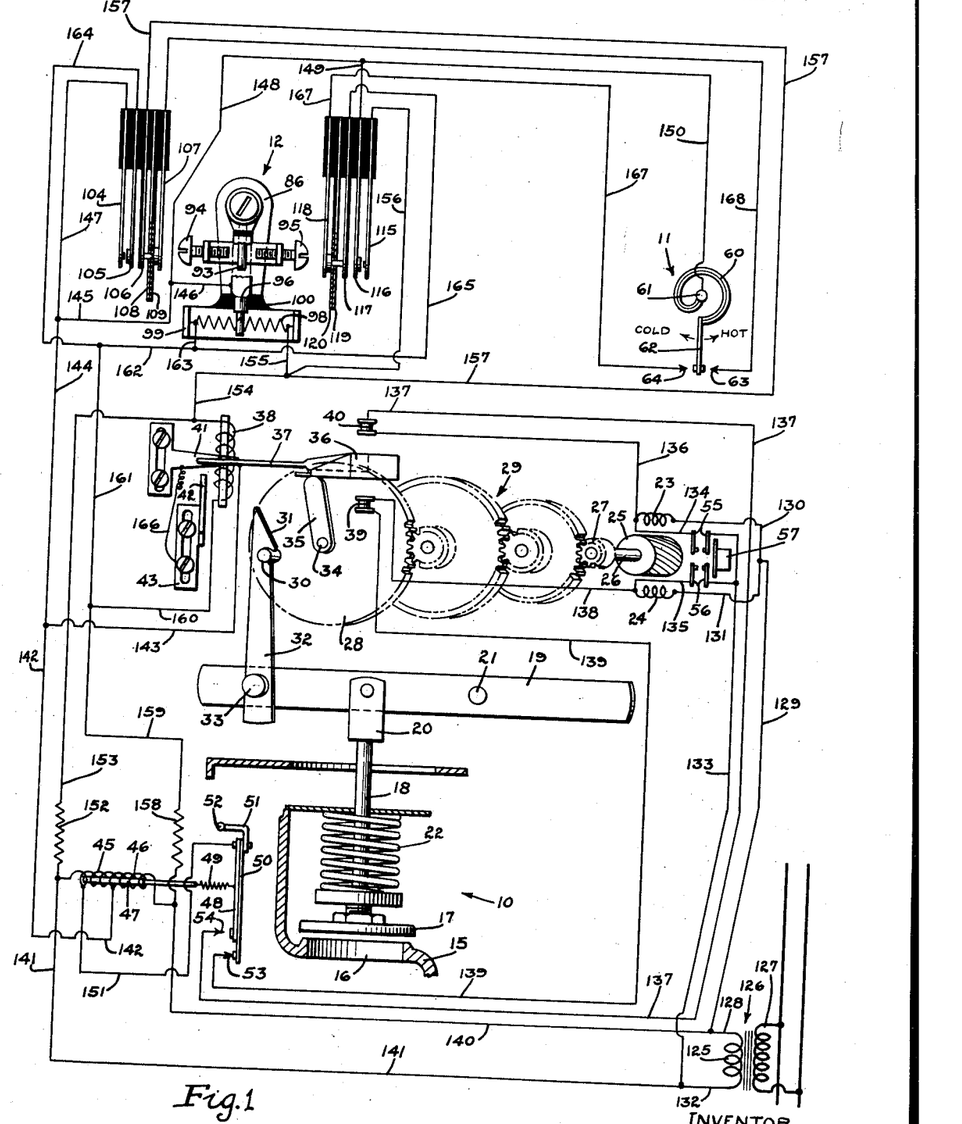
Fig. 1 is a schematic showing of one form of the present invention.

Referring first to Fig. 1 of the drawings, a condition or force changing device is herein diagrammatically shown as comprising an electrically operated valve generally indicated at 10 which may control the flow of gas to a gas fired hot water boiler. The valve 10 is controlled by a condition or force responsive device herein shown as a room thermostat generally indicated at 11. The valve 10 is further controlled by a device generally indicated at 12 which responds to changes in a condition or force produced by the condition or force changing device 10 or responds to changes in the effectiveness of this condition or force changing device as distinguished from one that responds to the actual values of such condition or force or effectiveness thereof.

The electrically operated valve 10 includes a valve casing 15 (only partially shown herein) which is provided with the usual valve opening 16 that is adapted to be closed by a valve disc 17. The valve disc 17 is carried by a valve stem 18 which is pivoted to a lever 19 by means of a bracket 20. Lever 19 is pivoted at a point indicated at 21. The valve disc 17 is biased to closed position by a spring 22. The valve disc 17 is adapted to be moved to open position against the bias of spring 22 by means of a motor comprising a pair of field windings 23 and 24 which operate a motor rotor 25 mounted upon a rotor shaft 26. A pinion 27, which is carried by rotor shaft 26, is adapted to drive a main gear 28 through suitable reduction gearing generally indicated at 29. The main gear 28 carries a crank pin 30 which, upon clockwise rotation of main gear 28, is adapted to engage the hooked end 31 of a link 32 which is pivoted to lever 19 at a point indicated at 33. The main gear 28 is secured to a shaft 34 which also carries an operator 35. Upon clockwise rotation of main gear 28, the operator 35 engages and lifts an assembly 36 which includes a balancing contact finger 37 that is adapted to engage a balancing resistance 38. The initial upward movement of assembly 36 allows a limit switch 39 to move to closed position, and when the valve has been moved to full open position, the assembly 36 opens a similar limit switch 40. The under side of balancing resistance 38 is engaged by an adjustable contact finger 41 which, in the present showing of the invention, is engaging the mid-portion of balancing resistance 38. The balancing contact finger 37, when moved downwardly, is adapted to ride upon a cam surface 42 formed on an adjustable bracket 43 by means of which the balancing contact finger 37 is lifted off of the balancing resistance 38. With the parts adjusted as shown, the balancing contact finger 37 cannot engage the lower quarter of balancing resistance 38.

The valve 10 is controlled by a balanced relay mechanism comprising a pair of solenoid windings 45 and 46 which are of equal power and control a plunger 47. Plunger 47 is connected to a relatively stiff switch arm 48 through a coiled spring 49. This relatively stiff switch arm 48 and a flexible switch arm 50 are secured to a bracket 51 which is pivoted at 52. The flexible switch arm 50 is adapted to engage a contact 53 whenever plunger 47 is in its central position by reason of solenoid windings 45 and 46 being equally or substantially equally energized. When solenoid winding 45 is the more highly energized, then the plunger 47 moves to the left to a further degree and brings stiff switch arm 48 into engagement with contact 54. Similarly, when solenoid winding 46 is the more highly energized, then plunger 47 moves to the right of the position shown in the drawings, and flexible switch arm 50 disengages contact 53.

The valve 10 also includes a recycling switching mechanism comprising two pairs of cooperating switch arms indicated at 55 and 56. These pairs of switch arms are adapted to be moved to closed circuit position upon manipulation of a manually operable member 57 which at the same time is operable to hold the valve disc 17 in a partial open position after having been manually moved thereto upon the occurrence of a power failure, as is well known in the art. For further details of the construction of valve 10 and its general operation, reference may be had to the copending application of Lewis L. Cunningham, Serial No. 697,686 which was filed November 11, 1933.

The room thermostat 11 comprises a coiled bimetallic element 60 having one of its ends secured to a post 61. The other end of bimetallic element 60 controls a contact blade 62. When the room temperature to which bimetallic element 60 responds rises to some predetermined high value of say 72° F., contact blade 62 moves into engagement with a contact 63, and when the room temperature falls to some lower value, say 70° F., the contact blade 62 moves into engagement with a contact 64. For temperatures intermediate 70° F. and 72° F. the contact blade 62 is intermediate the contacts 63 and 64, as shown in Fig. 1.

Figure 2:
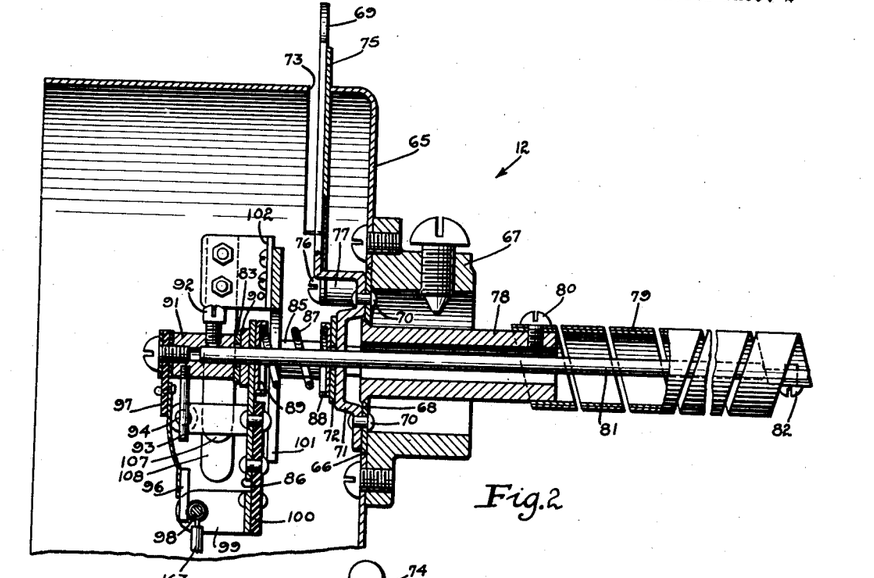
Fig. 2 is a sectional view of one form of current controlling mechanism which may be used in the system of Fig. 1.
Figure 3:
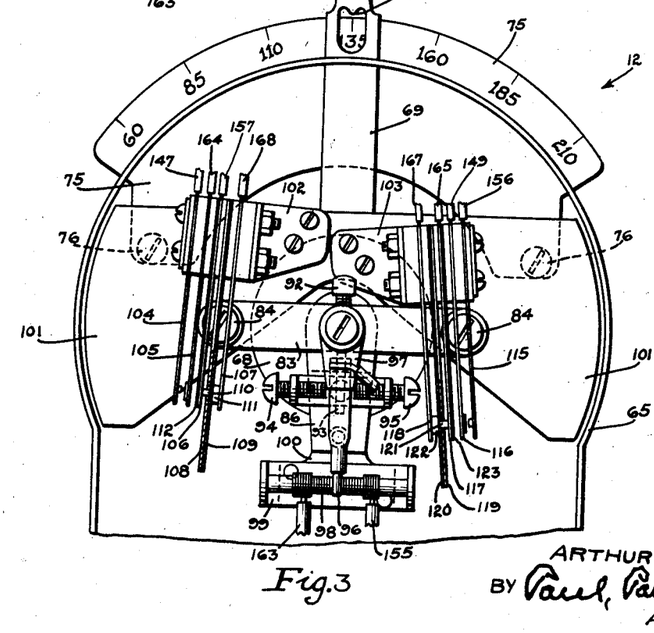
Fig. 3 is a front view of the current controlling mechanism of Fig. 2.

Turning now to Figs. 2 and 3 of the drawings, the mechanism 12 comprises a casing 65 which is provided with a circular opening in its rear wall, as indicated at 66. A flanged mounting member 67 is mounted upon the rear wall of casing 65 concentrically with the opening 66 and covers a portion of this opening. A circular plate 68 is placed in the opening 66 and abuts the mounting member 67. This plate is provided with an operating handle 69 which is secured to the plate 68 by means of rivets 70 and is provided with an upraised portion 71. A bracket 72, which is suitably secured to the rear wall of casing 65, presses against this upraised portion 71 of operating handle 69 whereby the circular plate 68 is held in place within the opening 66 and in abutting relationship with the mounting member 67. The operating handle 69 extends through an opening 73 in the upper portion of casing 65 and is provided with a pointer 74 which cooperates with a scale plate 75 that is secured to the rear wall of casing 65 as by screws 76 and sleeves 77. A tubular member 78 is suitably secured to circular plate 68 and extends from the rear of casing 65. One end of a helically coiled bimetallic actuating element 79 is secured to tubular member 78 by a screw 80, and its other end is secured to a torsion rod 81 by a screw 82. The torsion rod 81 extends through the axis of bimetallic helix 79, through tubular member 78 and through the operating handle 69 and bracket 72 and terminates within the casing 65.

A second bracket 83, through which the torsion rod 81 extends, is secured to the rear wall of casing 65 by means of suitable screws 84 and spacing sleeves 85, the arrangement being such that bracket 83 is spaced from bracket 72. Preferably, these same screws 84 and spacing sleeves 85 operate to hold the bracket 72 upon the rear wall of casing 65. Stop carrying member 86, which is loosely mounted upon torsion rod 81, is frictionally connected thereto by means of a coiled spring 87 having one of its ends abutting a spring retainer 88 which in turn abuts bracket 72 and which has its other end abutting a combination spring retainer and friction washer 89 which abuts the stop carrying member 86. Preferably, a friction washer 90 is interposed between stop carrying member 86 and the bracket 83. In this manner, the stop carrying member 86 is frictionally held against rotation with torsion rod 81 but is free to rotate therewith under certain conditions, as will become apparent hereinafter. A sleeve 91 is secured to the inner extremity of torsion rod 81 by means of a set screw 92 and is provided with a downwardly extending actuator 93 which extends between a pair of adjustable stop screws 94 and 95 that are carried by stop carrying member 86. A contact finger 96, which is secured to sleeve 91 through a strip of insulating material 97, engages a resistance coil 98 carried by a bracket 99 that is secured to stop carrying member 86 by means of a piece of insulating material 100.

A bridging member 101, which extends across the casing 65, supports a pair of brackets 102 and 103. Bracket 102 carries a switch assembly comprising switch arms 104, 105, 106, and 107. Interposed between switch arms 106 and 107 is an operating member 108 which is provided with a backing member 109 of insulating material. The switch arm 106 is provided with a contact 110 that extends through suitable openings in switch operating member 108 and backing member 109 and normally engages a contact 111 carried by switch arm 107. Switch arms 104 and 105 are normally disengaged. Switch arm 106 is provided with a backing member of insulating material indicated at 112. These various switch arms and the switch operating member 108 are all suitably electrically insulated from the bracket 102 and from each other. The bracket 103 supports a similar switching assembly comprising switch arms 115, 116, 117, and 118. Interposed between switch arms 117 and 118 is a switch operating member 119 which has associated therewith a backing member 120 of insulating material. The switch arm 117 is provided with a contact 121 which extends through suitable openings in switch operating member 119 and backing member 120 and normally engages a contact 122 that is carried by switch arm 118. The switch arm 117 is further provided with a backing member 123 of insulating material. Switch arms 115 and 116 are normally disengaged. These various switch arms and the switch operating member 119 are all insulated from bracket 103 and from each other.

In operation, the bimetallic helix 79 is adapted to be subjected to some heater condition, such, for instance, as the temperature of the hot water in a hot water boiler. It will be noted that the contact finger 96 and the actuator 93 are directly secured to the torsion rod 81 and move in conformity therewith. Upon rise in the temperature to which bimetallic element 79 is subjected, the contact finger 96 and actuator 93 are moved in a counter-clockwise direction as viewed in Fig. 3. For relatively small boiler fluctuations of say 10° F., the contact finger 96 is moved back and forth across the whole resistance coil 98 and the actuator 93 does not engage either of stop screws 94 or 95. However, if the temperature rises more than this amount, the actuator 93 engages stop screw 95 and moves the stop carrying member 86 and resistance coil carrying bracket 99 in a counter-clockwise direction. If the temperature becomes excessive, the bracket 99 engages the insulating backing member 120 and moves the same, together with the switch actuator 119, into engagement with switch arm 117 whereby contacts 121 and 122 are disengaged. This movement also brings the backing member 123 into engagement with switch arm 116 so as to move the same into engagement with switch arm 115. Similarly, upon excessive temperature fall, the bracket 99 engages backing member 109 so as to move switch operating member 108 into engagement with switch arm 106 whereby contacts 110 and 111 are separated. Also, the backing member 112 is thereby brought into engagement with switch arm 105 whereby the same moves into engagement with switch arm 104. The switching mechanism carried by bracket 102 comprises a low limit switching mechanism, and the switching mechanism carried by bracket 103 comprises a high limit switching mechanism, as will hereinafter become apparent.

The frictional engagement of stop carrying member 86 with the washer 90 and bracket 83 is such that this stop carrying member will remain in any position to which it is moved so that the contact finger 96 moves back and forth across resistance coil 98 without moving the stop carrying member 86 or the resistance coil 98, except when the temperature changes sufficiently to cause the actuator 93 to engage one of the stop screws 94 or 95. The temperature at which the contact finger 96 engages any particular portion of resistance coil 98 is not fixed, but, as heretofore explained, a definite temperature is required to cause movement of contact finger 96 from one extremity of the resistance coil 98 to its other extremity. On the other hand, the temperatures at which the high and low limit switching mechanisms are operated are definitely fixed since these switches are only operated upon movement of bracket 99 to extreme positions by reason of actuator 93 engaging its cooperating stop screws 94 and 95. The temperatures at which the high and low limit switches will be operated can be adjusted by moving operating handle 69 which operates to change the position of the relatively fixed end of bimetallic helix 79 and therefore operates to change the position of actuator 93 for any particular temperature value to which the bimetallic element 79 is subjected.

Returning now to Fig. 1 of the drawings, power is supplied to the system by the secondary 125 of a step-down transformer 126 having a high voltage primary 127 connected to suitable line wires. One side of secondary 125 is connected to one end of each of the field windings 23 and 24 by means of wires 128, 129, 130, and 131. The other side of secondary 125 is connected to the recycling switches 55 and 56 by means of wires 132 and 133. These recycling switches 55 and 56 are also connected to the other ends of field windings 23 and 24 by means of wires 134 and 135. This same end of field winding 23 is connected to contact 54 through limit switch 40 by means of wires 136 and 137, and the same end of field winding 24 is connected to contact 53 through limit switch 39 by means of wires 138 and 139.

One side of secondary 125 is also connected to one end of solenoid winding 46 by means of wires 128 and 140 while the other side of secondary 125 is connected to one end of solenoid winding 45 by wires 132 and 141. The junction of solenoid windings 45 and 46 is connected to balancing contact finger 37, to contact finger 96, switch arm 104, switch arm 116, and to bimetallic element 60 by means of wires 142, 143, 144, 145, 146, 147, 148, 149, and 150. Switch arms 48 and 50 are connected to a small number of turns of solenoid winding 45 by a wire 151. One end of solenoid winding 45 is connected to one end of balancing resistance 38, one end of resistance coil 98, switch arm 115, and switch arm 106 through a protective resistance 152 by means of wires 153, 154, 155, 156, and 157. Similarly, one end of solenoid winding 46 is connected to the other end of balancing resistance 38, to the other end of resistance coil 98, and to switch arms 105 and 117 through a protective resistance 158 by means of wires 159, 160, 161, 162, 163, 164, and 165. Bracket 43 is connected to contact finger 41 by means of a wire 166. Switch arm 118 is connected to contact 64 by a wire 167, and switch arm 107 is connected to contact 63 by a wire 168.

*Operation of the system of Fig. 1*

With the parts in the position shown in Fig. 1, the room temperature is intermediate 70° F. and 72° F. since contact blade 62 is intermediate contacts 63 and 64. The boiler temperature is likewise intermediate, and the contact finger 96 is shown engaged with the mid-portion of resistance 98. As a result, the balancing contact finger 37 is engaged with the mid-portion of balancing resistance 38, and the solenoid windings 45 and 46 are substantially equally energized so that flexible switch arm 50 is engaged with contact 53. The valve is therefore half open and is held in half open position by reason of the energization of field winding 24, the circuit for which is as follows: secondary 125 of transformer 126, wire 128, wire 129, wire 131, field winding 24, wire 138, limit switch 39, wire 139, contact 53, flexible switch arm 50, wire 151, a small number of turns of solenoid winding 45, wire 141, and wire 132 to the other side of secondary 125. The flow of current through the small number of turns of solenoid winding 45 upon engagement of flexible switch arm 50 with contact 53 increases the contact pressure between flexible switch arm 50 and contact 53, as will become apparent hereinafter. It should be pointed out here that the two field windings 23 and 24 operate rotor 25 in the same direction. Either one of these field windings, when energized, is capable of holding the valve disc 17 in any position to which it is moved against its biasing spring 22, and the energization of both of these field windings at the same time is sufficient to lift the valve disc 17 against the bias of spring 22.

As long as the room temperature remains intermediate 70° and 72° F., small fluctuations in boiler temperature will result in movement of contact finger 96 along resistance coil 98. Assuming there is a slight fall in boiler temperature so that contact finger 96 moves along resistance coil 98 toward the left-hand end thereof, the voltage drop across solenoid winding 45 will be increased and the voltage drop across solenoid winding 46 will be decreased whereupon plunger 47 will move further to the left flexing switch arm 50 and bringing switch arm 48 into engagement with contact 54. Field winding 23 will then be energized as follows: secondary 125, wire 128, wire 129, wire 130, field winding 23, wire 136, limit switch 40, wire 137, contact 54, switch arm 48, wire 151, a small number of turns of solenoid winding 45, wire 141, and wire 132 to the other side of secondary 125. This second circuit through the small number of turns of solenoid winding 45 will increase the contact pressure between switch arm 48 and contact 54. Energization of field winding 23 will cause rotation of motor rotor 25 in such direction as to rotate main gear 28 in a clockwise direction to raise further valve disc 17, it being remembered that field winding 24 is still energized. Such clockwise rotation of main gear 28 also moves balancing contact finger 37 upwardly along balancing resistance 38, and this movement continues until such time as the voltage drop across solenoids 45 and 46 are again substantially equalized, whereupon plunger 47 will return to the position shown in Fig. 1 of the drawings wherein switch arm 48 is disengaged from contact 54 but flexible switch arm 50 is engaged with contact 53. Field winding 23 is thereby deenergized, but the field winding 24 remains energized. As heretofore explained, this single field winding is insufficient to raise the valve so the opening movement of the valve ceases, but this energization of field winding 24 maintains the valve in its new position. In the event the boiler temperature continues falling until contact finger 96 reaches the left-hand end of resistance coil 98, then the valve will open fully and assembly 36 will engage the upper arm of limit switch 40 and open the same to deenergize field winding 23 whereby the valve will be held in its full open position by the energization of field winding 24.

Whenever the boiler temperature rises, contact finger 96 will move along resistance coil 98 toward the right-hand end thereof thereby increasing the voltage drop across solenoid winding 46 and decreasing the voltage drop across solenoid winding 45. Under these conditions, flexible switch arm 50 is moved from engagement with contact 53 whereupon field winding 24 is deenergized as well as field winding 23. The valve disc 17 is therefore moved toward closed position under the bias of spring 22. At the same time, counter-clockwise rotation of actuator 35 allows balancing contact finger 36 to move downwardly along balancing resistance 38 until a point is reached wherein the voltage drops across solenoid windings 45 and 46 are again equal, and flexible switch arm 50 is moved into engagement with contact 53. When this occurs, the field winding 24 is again energized to prevent further closing movement of the valve under the bias of its spring 22. Also, the resulting current flow through the small number of turns of solenoid 45 by the circuit heretofore described increases the contact pressure between flexible switch arm 50 and contact 53 to prevent chattering of the contacts.

As the boiler temperature continues to drop, this action will be repeated until the balancing contact finger 37 rides up the cam surface 42 at which time balancing contact finger 37 will be moved from engagement with balancing resistance 38. When this occurs, the balancing contact finger 37 is electrically connected to the center of balancing resistance 38 by the contact finger 41 and wire 166. Inasmuch as the contact finger 96 is near the right-hand end of resistance coil 98 at the time which would require movement of balancing contact finger 37 near the lower end of balancing resistance 38 to rebalance the energizations of solenoid windings 45 and 46, it will be impossible to rebalance these energizations whereby flexible switch arm 50 will remain disengaged from contact 53 and the valve will move to fully closed position. In this manner, when the valve reaches some minimum position during closing movement it quickly completely closes thereby eliminating danger of a pop back into the mixer by reason of the burner's being unable to handle such a small flow of gas. Movement of the valve to fully closed position under the bias of spring 22 imparts sufficient momentum to the main gear 28 and the motor rotor 25 and the gear reduction 29 to cause these parts to rotate a small amount after the valve disc 17 becomes seated wherefor the crank pin 30 moves a small distance away from the hooked end of link 32. Also, the assembly 36 moves to its lowermost position wherein it engages the lower arm of limit switch 39 and opens the same thereby preventing energization of field winding 24.

Now if the boiler temperature again rises so that contact finger 96 moves along resistance coil 98 towards the left-hand end thereof, solenoid winding 46 will remain more highly energized than solenoid winding 45 until the contact finger 96 reaches the middle of resistance coil 98. This is because balancing contact finger 37 is now electrically connected to the center of balancing resistance 38 by the contact finger 41 and wire 166. When the contact finger 96 reaches the middle of resistance coil 98 so that the solenoids 45 and 46 are equally energized, flexible switch arm 50 will be moved into engagement with contact 53, but field winding 24 will not be energized since limit switch 39 is open. Upon movement of contact finger 96 past the center of resistance coil 98 toward the left-hand end thereof due to further lowering in the boiler temperature, the voltage drop across solenoid winding 45 will become larger than the voltage drop across solenoid coil 46 whereupon switch arm 48 moves into engagement with contact 54 and energizes field winding 23 in the manner heretofore described. This energization of field winding 23 will be sufficient to rotate main gear 28 in a clockwise direction and bring crank pin 30 into engagement with hooked link 32 since during this time there is substantially no load upon the motor. Such movement of main gear 28 lifts assembly 36 a slight amount through actuator 35 so that limit switch 39 closes whereupon field winding 24 is also energized. The combination of field windings 23 and 24 continues rotation of main gear 28 whereupon valve disc 17 is raised against the mechanical resistance of its spring 22. The valve will therefore be raised to a little more than half open position in order to bring balancing contact finger 37 slightly past the central portion of balancing resistance 38 in order to rebalance the voltage drops across solenoid windings 45 and 46 so as to disengage switch arm 48 from contact 54 in the manner heretofore described. During this upward movement of balancing contact finger 37 it rides off the cam surface 42 whereby the contact finger 41 and wire 166 no longer electrically connect balancing contact finger 37 to the mid-portion of balancing resistance 38. It will therefore be noted that when the valve is closed it can only be opened when the demand for heat is sufficiently great as to result in a relatively large opening of the valve. In this manner, a relatively large initial flow of gas is supplied to the burner so as to prevent a flash-back into the mixer. The amount of initial opening can be varied by varying the position of contact finger 41 along balancing resistance 38.

From the foregoing it will be seen that whenever the room temperature is intermediate, the contact finger 96 and its associated resistance coil 98 will modulate the position of valve disc 17 to maintain the boiler temperature at whatever value it may happen to be. Now if the room temperature should rise so as to bring contact blade 62 into engagement with contact 63, the solenoid winding 45 will be substantially short-circuited by a circuit as follows: outer end of solenoid winding 45, protective resistance 152, wire 153, wire 154, wire 157, switch arms 106 and 107, wire 168, contact 63, contact blade 62, bimetallic element 60, wire 150, wire 148, wire 145, wire 144, and wire 142 to the inner end of solenoid winding 45. The plunger 47 will therefore move to its extreme right-hand position, and the circuits for both field windings 23 and 24 will be interrupted whereupon the valve disc 17 will move to closed position. It will be noted that when the solenoid winding 45 is thus short-circuited, the balancing contact finger 37 and balancing resistance 38 are unable to rebalance the voltage drops across solenoid windings 45 and 46, and for this reason upon an increase in room temperature to its allowable maximum of 72° F. the valve is closed irrespective of the boiler temperature, except for one condition to be explained hereinafter. The boiler temperature will now begin to fall, and if contact finger 96 reaches the left-hand end of resistance coil 98 actuator 93 will engage stop screw 94 and move the entire assembly comprising stop carrying member 86 and bracket 99 in a clockwise direction. During a decrease in boiler temperature, if the room temperature should fall somewhat so as to disengage contact blade 62 from contact 63, control will again be returned to the contact finger 96 and resistance coil 98 whereby the valve will again be modulated in an attempt to maintain the new boiler temperature. However, if the boiler temperature should decrease to some predetermined low value by reason of engagement of contact blade 62 with contact 63, then the bracket 99 will engage backing member 109 whereupon actuator 108 is moved into engagement with switch arm 106 and separates the same from switch arm 107 and also moves switch arm 105 into engagement with switch arm 104. As a result, the short-circuit for solenoid winding 45 is interrupted, and the solenoid 46 is substantially short-circuited as follows: from the outer end of solenoid winding 46, protective resistance 158, wire 159, wire 161, wire 164, switch arms 105 and 104, wire 147, wire 144, and wire 142 to the inner end of solenoid winding 46. Plunger 47 therefore moves to the extreme left and brings switch arms 48 and 50 into engagement with their contacts 54 and 53 whereupon both field windings 23 and 24 are energized and the valve moves to wide open position and opens limit switch 40 to deenergize field winding 23 as heretofore described. This is what is known as a low limit control in that the valve is opened to increase the boiler temperature when the boiler temperature reaches some predetermined minimum value irrespective of the temperature at the room thermostat. This particular phase of the operation of the system is not new with me and is well known in the art, but this low limit control operation in combination with the rest of the parts of the system is one of the novel points of my invention.

If the room temperature falls to 70° F. so as to bring contact blade 62 into engagement with contact 64, solenoid winding 46 is substantially short-circuited as follows: from the outer end of solenoid winding 46, protective resistance 158, wire 159, wire 161, wire 162, wire 165, switch arm 117, switch arm 118, wire 167, contact 64, contact blade 62, bimetallic element 60, wire 150, wire 148, wire 145, wire 144, and wire 142 to the inner end of solenoid winding 46. Plunger 47 will therefore move to its extreme left-hand position under these conditions and cause a full opening of the valve. Now as the boiler temperature rises, the contact finger 96 will move across resistance coil 98 to the right-hand end thereof whereupon actuator 93 will engage stop screw 95. Continued rise in boiler temperature causes counter-clockwise rotation of bracket 99, and, if the boiler temperature becomes excessive, the bracket 99 will engage backing member 120. Actuator 119 is therefore moved to separate switch arms 117 and 118 and bring switch arms 115 and 116 into engagement. The short-circuit for solenoid winding 46 is thereby interrupted and a substantial short-circuit for solenoid winding 45 is established as follows: from the outer end of solenoid winding 45, protective resistance 152, wire 153, wire 154, wire 156, switch arms 115 and 116, wire 149, wire 148, wire 145, wire 144, and wire 142 to the inner end of solenoid winding 45. Plunger 47 therefore moves to its extreme right-hand position and deenergizes both field windings 23 and 24, and the valve closes.

From the foregoing description it will be seen that the room thermostat normally has absolute command in that it can fully open or fully close the valve whenever the room temperature becomes too low or too high. However, if the boiler temperature should become excessive or if it should become lower than that desired, then the bracket 99 operates the high limit or low limit switch assemblies, as the case may be, and respectively closes or opens the valve. On the other hand, whenever the room temperature is intermediate, the contact finger 96 cooperates with resistance coil 98 to maintain the boiler temperature at whatever temperature it happened to be when the room temperature became intermediate. As heretofore explained, by reason of the frictional mounting of the stop carrying member 86 and bracket 99, the resistance coil 98 does not assume any definite position for each boiler temperature, but the contact finger 96 sweeps thereacross in response to predetermined changes in the boiler temperature of say 10° F., but independently of the actual boiler temperature. As a result, the contact finger 96 may engage the center of resistance coil 98 for any temperature of the boiler water ranging between the permissible lowest temperature and the permissible highest temperature. This depends entirely upon the boiler temperature prevailing at the time that the room temperature becomes intermediate so as to bring contact blade 62 intermediate contacts 63 and 64.

Figures 4, 5, 6:
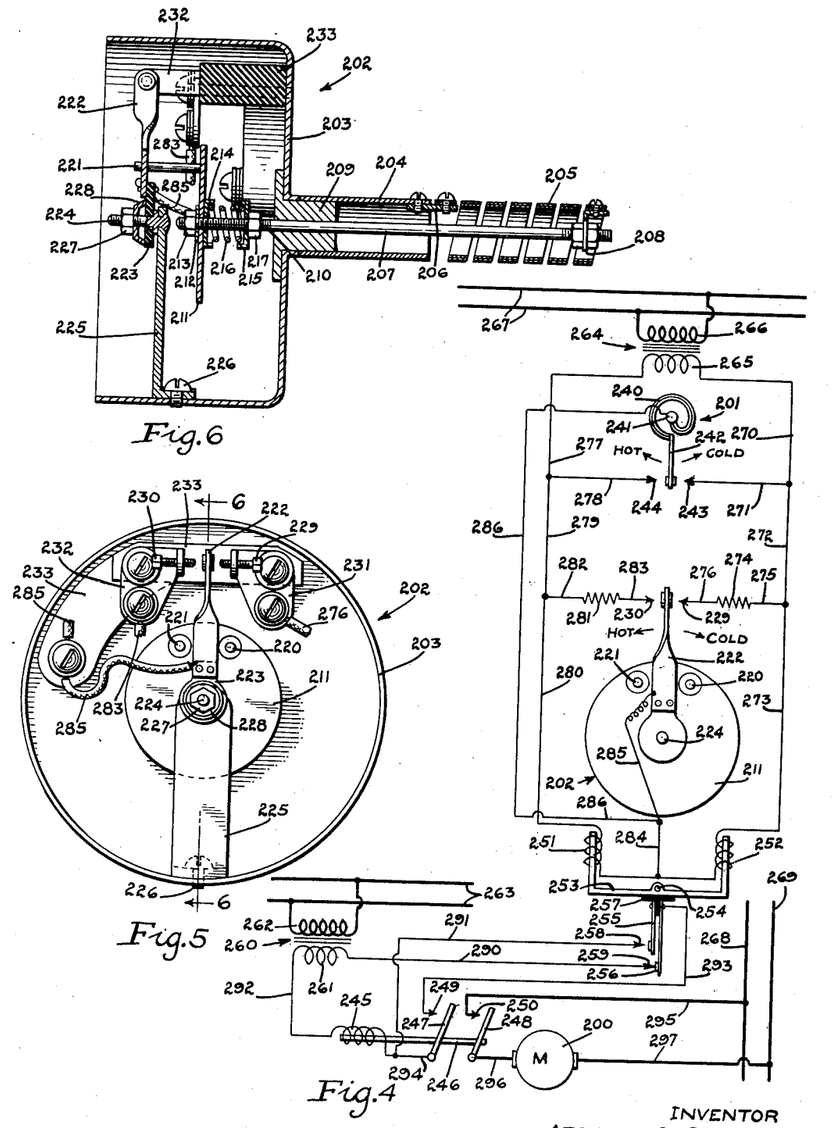
Fig. 4 is a diagrammatic showing of a modified form of the invention.
Fig. 5 is a front view of the current controlling mechanism used in the system of Fig. 4.
Fig. 6 is a sectional view taken about on the line 6—6 of Fig. 5.

Turning now to Figs. 4, 5, and 6, a simplified system is shown therein in which the valve or other condition or force changing device is not modulated. The condition or force changing device is herein illustrated as comprising a motor 200 which may well be the motor of a stoker or oil burner. The motor 200 is controlled by a room thermostat 201 and a switching mechanism 202.

Referring particularly to Figs. 5 and 6, the switching mechanism 202 comprises a casing 203 of circular formation which is provided with a tubular extension 204. One end of a helically coiled bimetallic element 205 is secured to tubular extension 204 by a bracket 206, and its other end is secured to a torsion rod 207 by means of a bracket 208. The torsion rod 207 extends through the bimetallic helix 205 and the tubular member 204 and terminates within casing 203. Preferably, a bearing member 209 is placed in tubular member 204 in order to properly support the torsion rod 207. The inner extremity of torsion rod 207 is provided with screw threads as indicated at 210. An actuator 211, which is loosely journalled upon torsion rod 207, abuts a washer 212 held in place by a nut 213. Actuator 211 is held in abutting relationship with washer 212 by means of a friction assembly including spring retainers 214 and 215 and an interposed compression spring 216 and a nut 217. In this manner, the actuator 211 is frictionally secured to torsion rod 207 whereby it normally moves in conformity therewith but allows continued motion of torsion rod 207 when the movement of actuator 211 is restricted. The actuator 211 is provided with a pair of spaced actuating pins 220 and 221. These pins 220 and 221 straddle a contact arm 222 which is secured to an insulating member 223. Insulating member 223 is journalled upon a stud 224 carried by a bracket 225 that is in turn secured to casing 203 by a screw 226. A nut 227 and a spring washer 228 frictionally clamp insulating member 223 to the stud 224. The contact arm 222 is adapted to alternately engage a pair of spaced contacts 229 and 230 which are carried by brackets 231 and 232 that are mounted upon a block of insulating material 233. This block of insulating material 233 is suitably secured to the rear portion of casing 203.

When the temperature to which bimetallic element 205 responds rises, the torsion rod 207 is rotated in counterclockwise direction as viewed in Fig. 5, whereupon actuating pin 220 moves contact arm 222 into engagement with contact 230. Upon further temperature rise, the torsion rod 207 continues rotating but the actuator 211 is unable to rotate further, such relative rotation between the actuator 211 and torsion rod 207 being permitted by the slip frictional connection heretofore described. Upon a subsequent fall in the temperature to which bimetallic element 205 responds, actuator 211 immediately begins rotating in a clockwise direction. Actuating pin 220 first moves away from contact arm 222 and thereafter actuating pin 221 moves into engagement therewith and moves this contact arm 222 from engagement with contact 230 and into engagement with contact 229. In this manner, the contact arm 222 is moved into engagement with the contacts 229 and 230 upon changes in the temperature to which bimetallic element 205 responds but independently of the actual value of such temperature by reason of the slip connection between torsion rod 207 and the actuator 211. In the system of Fig. 4, the bimetallic element 205 preferably responds to boiler temperature as heretofore explained in connection with the system of Fig. 1, and preferably a change of approximately 10° F. in the boiler water is required to move contact arm 222 from engagement with one of the contacts 229 or 230 and into engagement with the other thereof.

The room thermostat 201 comprises a bimetallic element 240 having one of its ends fixed as by a post 241. The other end of bimetallic element 240 carries a contact blade 242, which, upon an increase in the room temperature to approximately 72° F. moves into engagement with a contact 244 and upon a decrease in the room temperature to approximately 70° F. moves into engagement with a contact 243.

The motor 200 is controlled by a relay comprising a relay coil 245 which, upon energization, attracts an armature 246 and moves switch arms 247 and 248 into engagement with contacts 249 and 250. This relay coil 245 is in turn controlled by a balanced relay mechanism including a pair of relay coils 251 and 252 which control an armature 253 that is pivoted as at 254. Armature 253 carries a pair of switch arms 255 and 256 through the medium of a piece of insulating material 257, the contacts 255 and 256 being electrically connected to each other. Switch arm 255 is adapted to engage a contact 258, and switch arm 256 is adapted to engage a contact 259.

Low voltage power for relay coil 245 is supplied by a transformer 260 having a low voltage secondary 261 and a high voltage primary 262 which is connected to suitable line wires 263. Low voltage electrical power is supplied to relay coils 251 and 252 by means of a step-down transformer 264 having a low voltage secondary 265 and a high voltage primary 266 connected to suitable line wires 267. High voltage power is supplied to motor 200 by line wires 268 and 269. One side of secondary 265 is connected to contact 243 and to one end of relay coil 252 by wires 270, 271, 272, and 273. This same side of secondary 265 is connected to contact 229 through a protective resistance 274 by means of wires 270, 272, 275, and 276. The other side of secondary 265 is connected to contact 244 and to one end of relay coil 251 by wires 277, 278, 279, and 280. This same side of secondary 265 is connected to contact 230 through a protective resistance 281 by means of wires 277, 279, 282, and 283. The other ends of relay windings 251 and 252 are connected to contact arm 222 and bimetallic element 240 by means of wires 284, 285, and 286. The remaining circuit connections will be described during the detailed description of the operation of the system of Fig. 4.

*Operation of the system of Fig. 4*

With the parts in the position shown, the room temperature is intermediate 70° and 72° F., and the contact arm 222 is intermediate its cooperating contacts 229 and 230. Relay coils 251 and 252 are therefore connected in series across transformer secondary 265 and are equally energized, the circuit being as follows: secondary 265, wire 270, wire 272, wire 273, relay coil 252, relay coil 251, wire 280, wire 279, and wire 277 to the other side of secondary 265. As a result, armature 253 is in its intermediate position shown in Fig. 4 wherein switch arm 256 is in engagement with contact 259, but switch arm 255 is disengaged from its contact 258. Relay coil 245 is deenergized, and the switch arms 248 and 247 are disengaged from their respective contacts 250 and 249. Motor 200 is deenergized.

Since no heat is being furnished either to the boiler or to the room, both the boiler temperature and the room temperature will soon begin to decrease. Assuming that the boiler temperature decreases first so as to bring contact arm 222 into engagement with contact 229, the relay coil 252 will be partially short-circuited as follows: relay coil 252, wire 273, wire 275, protective resistance 274, wire 276, contact 229, contact arm 222, wire 285, and wire 284 to the other side of relay coil 252. Relay coil 251 will therefore rotate armature 253 in a clockwise direction about its pivot 254 flexing switch arm 256 and bringing switch arm 255 into engagement with contact 258. Relay coil 245 is thereupon energized as follows: secondary 261 of transformer 260, wire 290, contact 259, switch arms 256 and 255, contact 258, wire 291, relay coil 245, and a wire 292 to the other side of secondary 261. Energization of relay coil 245 attracts its armature 246 and moves switch arms 247 and 248 into engagement with contacts 249 and 250. Engagement of switch arm 247 with contact 249 establishes a holding circuit for relay coil 245 which is independent of contact 258 and switch arm 255. This holding circuit is as follows: secondary 261, wire 290, contact 259, switch arm 256, a wire 293, contact 249, switch arm 247, wire 294, relay coil 245, and wire 292 to the other side of secondary 261. Engagement of switch arm 248 with contact 250 establishes an energizing circuit for motor 200 as follows: line wire 268, a wire 295, contact 250, switch arm 248, a wire 296, motor 200, and a wire 297 to line wire 269. Heat will therefore be supplied to the boiler, and the temperature of the boiler water will rise causing movement of contact arm 222 from engagement with contact 229. When this occurs, the relay coils 251 and 252 will again become equally energized, and the relay armature 253 will move to the position shown in Fig. 4, wherein switch arm 255 is disengaged from contact 258 but switch arm 256 is engaged with contact 259. This interrupts the initial energizing circuit for relay coil 245, but this relay coil remains energized by the above described holding circuit. As the boiler temperature continues to rise, contact arm 222 moves towards and finally engages contact 230, whereupon relay coil 251 is partially short-circuited as follows: relay coil 251, wire 280, wire 282, protective resistance 281, wire 283, contact 230, contact arm 222, wire 285, and wire 284 to the other side of relay coil 251. Relay coil 252 now becomes the more highly energized and rotates armature 253 about its pivot 254 in a counter-clockwise direction to disengage switch arm 256 from contact 259 whereupon the holding circuit for relay coil 245 is interrupted. Switch arms 247 and 248 therefore move to the position shown in Fig. 4 of the drawings, and the motor energizing circuit is interrupted. In this manner, as long as the room temperature remains intermediate, the slip frictional boiler thermostat causes intermittent operation of the motor 200.

In the event the room temperature decreases to 70° F. so as to move contact blade 242 into engagement with contact 243, relay coil 252 will be completely short-circuited by a circuit which is as follows: relay coil 252, wire 273, wire 272, wire 271, contact 243, contact blade 242, bimetallic element 240, wire 286, and wire 284 to the other side of relay coil 252. Relay coil 251 is now somewhat more highly energized than relay coil 252 even if contact arm 222 is engaged with contact 230 since the short-circuiting action by the room thermostat is complete whereas the short-circuiting action by the slip frictional boiler control is only partial by reason of the inclusion of the protective resistance 281. Switch arms 255 and 256 therefore both move into engagement with their respective contacts 258 and 259, and motor 200 will be energized irrespective of the position of contact arm 222. As soon as the room temperature is somewhat restored so as to move contact blade 242 from engagement with contact 243, then the complete short-circuiting of relay coil 252 will be removed. At this time, the contact arm 222 will undoubtedly be in engagement with contact 230 so that relay coil 251 is partially short-circuited whereupon switch arms 255 and 256 will both move from engagement with their respective contacts 258 and 259, and the motor 200 will be deenergized. Control has now been returned to the slip frictional boiler control.

In the event the room temperature becomes too high so that contact blade 242 moves into engagement with contact 244, the relay coil 251 will be completely short-circuited as follows: relay coil 251, wire 280, wire 279, wire 278, contact 244, contact blade 242, bimetallic element 240, wire 286, and wire 284 to the other side of relay coil 251. Switch arms 255 and 256 therefore remain out of engagement with contacts 258 and 259 or are moved from engagement therewith even if contact arm 222 is engaged with contact 229 since, as heretofore explained in connection with a call for heat by the room thermostat, the short-circuit produced by the room thermostat is a complete short-circuit whereas the short-circuit produced by the slip friction boiler control is only partial by reason of the protective resistance 274.

In this manner, the slip friction boiler control normally controls the operation of the motor 200, but the room thermostat operates to absolutely provide energization of motor 200 or deenergization thereof if the room temperature becomes too low or too high. By reason of the fact that the contact arm 222 is controlled by reversals of boiler temperature rather than at any predetermined actual boiler temperatures, the boiler control will attempt to maintain the last boiler temperature which prevailed at the time the room temperature became intermediate and restored the control to the boiler control. Of course, it is contemplated that the usual high limit control should be provided to prevent excessive boiler temperatures, and, if desired, a low limit control similar to that provided in the system of Fig. 1 may also be provided.

In both systems it will be noted that the valve or motor broadly represents a condition or force changing device or a temperature changing device and that this condition or force changing device or temperature changing device is controlled by the actual room temperatures and by changes in some condition (such as boiler temperature) produced by the condition or force changing device or in accordance with changes in the output or capacity or effectiveness of the condition or force changing device. In the preferred system, the means which is responsive to changes in the condition or force or effectiveness or capacity or output operates to modulate the action of the condition or force changing device. It will also be noted that the systems of the present invention are so arranged that a room thermostat having three positions, namely a first position in which one contact is made, a second position wherein another contact is made, and a third position wherein neither contact is made, and preferably a thermostat of the type which alternately engages a pair of contacts and has an intermediate position is correlated with another device operative upon changes in a condition or force rather than actual values thereof in such manner that for two of the room thermostat positions it has absolute control, and for the third position the device responsive to changes in the condition or force takes control.

Many changes in the details of construction and wiring arrangements may, of course, be made by those skilled in the art, and I therefore intend to be limited only by the scope of the appended claims.

I claim:

1. In combination, a condition changing device, electrical means for operating the condition changing device, an element responsive to the actual effectiveness of the condition changing device, a switch movable to a given circuit controlling position when the value of said effectiveness reaches a predetermined point, circuit controlling means, non-positive transmission means associated with said element and circuit controlling means for operating the latter upon changes in the effectiveness of the condition changing device but irrespective of the actual value thereof, a main controlling switch means responsive to a condition which is altered by the condition changing device, and electrical connections for said electrical means including said switch, circuit controlling means, and switching means, the arrangement being such that said switch means prevents operation of said electrical means when said condition is at one value and permits said circuit controlling means to operate said electrical means when said condition is at a second value, and said switch entirely preventing operation of said electrical means when the value of the effectiveness of said condition changing device reaches said predetermined point.

2. In combination, a condition changing device, electrical means for operating the condition changing device, an element responsive to the actual effectiveness of the condition changing device, a switch movable to a given circuit controlling position when the value of said effectiveness reaches a predetermined point, circuit controlling means, non-positive transmission means associated with said element and circuit controlling means for operating the latter upon changes in the effectiveness of the condition changing device but irrespective of the actual value thereof, a main controlling switch means responsive to a condition which is altered by the condition changing device, and electrical connections for said electrical means including said switch, circuit controlling means, and switch means, the arrangement being such that said switch means prevents operation of said electrical means when said condition is at one value and permits said circuit controlling means to operate said electrical means when said condition is at a second value, and said switch operating said electrical means irrespective of the condition of said circuit controlling means or said switch means when the effectiveness of said condition changing device reaches said predetermined point.

3. In combination, a temperature changer, a control element responsive to changes in a condition directly produced by said temperature changer and having a limited operative movement in response to relatively small changes in said condition and irrespective of the actual value of said condition, connections between said element and temperature changer for gradually varying the effectiveness of the latter in accordance with the movements of the former, means responsive to the temperature to be controlled, and connections between said means and said temperature changer for increasing the effectiveness thereof to a predetermined maximum value when the temperature to be controlled reaches one value and for decreasing the effectiveness to a predetermined minimum value when the temperature to be controlled reaches another value.

4. In combination, a temperature changer, a control element responsive to changes in a condition directly produced by said temperature changer and having a limited operative movement in response to relatively small changes in said condition and irrespective of the actual value of said condition, connections between said element and temperature changer for gradually varying the effectiveness of the latter in accordance with the movements of the former, a member responsive to the temperature to be controlled, and connections between said member and temperature changer for increasing said effectiveness to a maximum when the temperature to be controlled reaches one value and for decreasing it to a minimum when the temperature to be controlled reaches another value.

5. In combination, a temperature changer, oppositely acting electrical devices in control of the operation of said temperature changer, circuit varying means associated with said electrical devices for variably energizing the same, an element responsive to a condition directly produced by said temperature changer, non-positive transmission means associating said circuit varying means with said element, and circuit controlling means responsive to the temperature to be controlled associated with said electrical devices for changing the energization of one of said devices in respect to the other.

6. In combination, a temperature changer, oppositely acting electrical devices in control of the operation of said temperature changer, circuit varying means associated with said electrical devices for variably energizing the same, an element responsive to a condition directly produced by said temperature changer, non-positive transmission means associating said circuit varying means with said element, and circuit controlling means responsive to the temperature to be controlled associated with said electrical devices for substantially short-circuiting one of said devices at one value of the temperature to be controlled and for substantially short-circuiting the other of said devices at another value of the temperature to be controlled.

7. In combination, a temperature changer, oppositely acting electrical devices in control of the operation of said temperature changer, circuit varying means associated with said electrical devices for variably energizing the same, an element responsive to a condition directly produced by said temperature changer, non-positive transmission means associating said circuit varying means with said element, circuit controlling means responsive to the temperature to be controlled associated with said electrical devices and comprising a pair of switches alternately closed upon fall and rise in the temperature to be controlled, there being an intermediate position in which both of said switches are open, and circuit connections between said switches and electrical devices enabling each switch to substantially short-circuit one of said devices.

8. In combination, a temperature changer, oppositely acting electrical devices in control of the operation of said temperature changer, circuit varying means associated with said electrical devices for variably energizing the same, an element responsive to a condition directly produced by said temperature changer, non-positive transmission means associating said circuit varying means with said element, circuit controlling means responsive to the temperature to be controlled associated with said electrical devices and comprising a pair of switches alternately closed upon fall and rise in the temperature to be controlled, there being an intermediate position in which both of said switches are open, circuit connections between said switches and electrical devices enabling each switch to substantially short-circuit one of said devices, and switching means directly controlled by said element for additionally controlling the operation of said temperature changer.

9. In combination, a temperature changer, oppositely acting electrical devices in control of the operation of said temperature changer, circuit varying means associated with said electrical devices for variably energizing the same, an element responsive to a condition directly produced by said temperature changer, non-positive transmission means associating said circuit varying means with said element, circuit controlling means responsive to the temperature to be controlled associated with said electrical devices and comprising a pair of switches alternately closed upon fall and rise in the temperature to be controlled, there being an intermediate position in which both of said switches are open, circuit connections between said switches and electrical devices enabling each switch to substantially short-circuit one of said devices and a switch directly controlled by said element for substantially short-circuiting one of said electrical devices.

10. In combination, a temperature changer, a pair of oppositely acting electrical devices in control of the operation of said temperature changer, variable resistance means associated with said electrical devices for varying the energization of one of said devices in respect to the other, means responsive to changes in a condition irrespective of the actual value thereof directly produced by said temperature changer in control of said variable resistance means, thermostatic circuit controlling means responsive to the actual value of a temperature condition for substantially short-circuiting one or the other of said devices, and switching means responsive to the actual value of a condition directly produced by said temperature changer for substantially short-circuiting one of said devices.

11. In combination, a temperature changer, a pair of oppositely acting electrical devices in control of the operation of said temperature changer, variable resistance means associated with said electrical devices for varying the energization of one of said devices in respect to the other, means responsive to changes in a condition directly produced by said temperature changer in control of said variable resistance means, a pair of switches associated with said devices for substantially short-circuiting one or the other thereof, and thermostatic means responsive to actual temperature values in control of said switches.

12. In combination, a temperature changer, a pair of oppositely acting electrical devices in control of the operation of said temperature changer, variable resistance means associated with said electrical devices for varying the energization of one of said devices in respect to the other, means responsive to changes in a condition directly produced by said temperature changer in control of said variable resistance means, a space temperature responsive thermostatic element, and a pair of switches controlled thereby for at least partially short-circuiting one or the other of said devices.

13. In combination, a temperature changer, electrical means for controlling said temperature changer, switching means in control of said electrical means, a pair of oppositely acting normally electrically balanced devices in control of said switching means, variable resistance means associated with said devices for unbalancing their energizations, switching means for additionally unbalancing the energizations of said devices, one of said two last-named means responding to actual values of a condition indirectly produced by the temperature changer and the other of said last-named means responding to predetermined changes in the value of a condition directly produced by the temperature changer, and means for rebalancing the energizations of said devices controlled by said electrical means.

14. In combination, a temperature changer, electrical means for controlling said temperature changer, switching means in control of said electrical means, a pair of oppositely acting normally electrically balanced devices in control of said switching means, variable resistance means associated with said devices for unbalancing their energizations and responsive to changes in the value of a temperature changer condition but independent of the actual value thereof, switching means responsive to predetermined values of a condition which is altered by the temperature changer for additionally unbalancing the energizations of said devices, and means for rebalancing the energizations of said devices controlled by said electrical means.

15. In combination, a temperature changer, electrical means for controlling said temperature changer, switching means in control of said electrical means, a pair of oppositely acting normally electrically balanced devices in control of said switching means, variable resistance means associated with said devices for unbalancing their energizations and responsive to changes in the value of a temperature changer condition but independent of the actual value thereof, a pair of switches responsive to a condition which is altered by the temperature changer for at least partially short-circuiting one or the other of said devices, and means for rebalancing the energizations of said devices controlled by said electrical means.

16. In combination, a temperature changer, oppositely acting electrical means for controlling said temperature changer, two pairs of switches in control of said oppositely acting electrical means, an element responsive to a temperature condition directly controlling one of said pairs of switches, an element responsive to a temperature changer condition and non-positive transmission means associating said last-named element with the other of said pair of switches.

17. A temperature changing system, comprising, in combination, a temperature changer, a pair of oppositely acting electrical devices in control thereof, first and second pairs of switches for at least partially short-circuiting one or the other of said devices, an element responsive to the effectiveness of said temperature changer, non-positive connection means associating said element with one of said pairs of switches, and a space temperature responsive element in control of the other of said pairs of switches.

18. In combination, an electrically controlled condition changing device, electrical means in control thereof, a main controlling element responsive to a condition which is altered by the condition changing device, a first switch closed thereby upon movement of said element in one direction to a given position when the condition is at a first value, a second switch closed by said element upon movement in an opposite direction to a predetermined point when said condition reaches a second value, both of said switches being open when the value of said condition is intermediate said first and second values, connections between said switches and electrical means by which the former controls the latter to operate the condition changing device at a minimum effectiveness when one of said switches is closed and at a maximum effectiveness when the other of said switches is closed, and circuit controlling means responsive to changes in the value of the effectiveness of said condition changing device for modulating said electrical means when both of said switches are open.

19. In combination, an electrically controlled condition changing device, electrical means in control thereof, a main controlling element responsive to a condition which is altered by the condition changing device, a first switch closed thereby upon movement of said element in one direction to a given position when the condition is at a first value, a second switch closed by said element upon movement in an opposite direction to a predetermined point when said condition reaches a second value, both of said switches being open when the value of said condition is intermediate said first and second values, connections between said switches and electrical means by which the former controls the latter to operate the condition changing device at a minimum effectiveness when one of said switches is closed and at a maximum effectiveness when the other of said switches is closed, and variable resistance means responsive to changes in the effectiveness of said condition changing device placed in control of said electrical means when both of said switches are open.

20. A device of the class described, comprising, in combination, an element movable in response to changes in the value of a condition, a switch device, a variable resistance device, positive connections associating one of said devices with said element whereby the same is operated in accordance with the value of said condition, and non-positive transmission means associating the other of said devices with said element whereby said other device is operated upon changes in said condition irrespective of the actual value of said condition.

21. A device of the class described, comprising in combination, a member movable in accordance with changes in the value of a condition, current controlling means operated thereby and including a carrier, a support, non-positive connecting means connecting said carrier to said support whereby said carrier is bodily moved upon excessive movement of said movable member, and a switch operated by said carrier.

22. A device of the class described, comprising, in combination, a support, a carrier, non-positive connecting means securing said carrier to said support, a resistance coil mounted upon said carrier, a member movable in accordance with changes in the value of a condition and cooperable with said resistance coil, excessive movement of said movable member causing bodily movement of said carrier, and a switch controlled by the movements of said carrier and operated when said carrier is moved to a predetermined point.

23. In a temperature control system, the combination of heating means for a space, a thermostat responsive to space temperature, connections between said thermostat and heating means to cause maximum operation of the heating means when the space temperature decreases to a first predetermined value and to stop operation of the heating means when the space temperature rises to a second predetermined higher value thereby adjusting the heating effect of the heating means to supply the correct amount of heat to the space, control means responsive to changes in the heating effect of the heating means irrespective of the actual value thereof, and connections between the control means and the heating means for controlling the heating means to maintain the heating effect of the heating means at the adjusted value whenever the space temperature is above the first predetermined value and below the second predetermined value.

24. In a temperature control system, the combination of a modulating type heating means for a space, a thermostat responsive to space temperature, control means responsive to changes in the heating effect of the heating means as distinguished from the actual value thereof, connections between said thermostat, control means and heating means to cause maximum operation of the heating means when the space temperature decreases to a predetermined value, to cause minimum operation of the heating means when the space temperature increases to a predetermined higher value, and to modulate the operation of the heating means between maximum and minimum under the control of the control means whenever the space temperature is between the two predetermined values.

25. A device of the class described, comprising, in combination, a helically coiled temperature responsive element having one of its ends relatively fixed, a rotatably mounted rod secured to the other end of said element whereby said rod is rotated in reverse directions upon changes in temperature in said element, a first current controlling mechanism, connections associating said mechanism with said rod to enable the rod to operate the first current controlling mechanism at definite temperature values, a second current controlling mechanism, and non-positive connecting means associating said second current controlling mechanism with said rod whereby said second current controlling mechanism is operated upon changes in temperature of said element irrespective of the actual temperature value of said element.

26. A device of the class described, comprising, in combination, an actuator movable in response to changes in the value of a condition, a first current controlling mechanism, non-positive connecting means associating said first current controlling mechanism with said element whereby said first current controlling mechanism is operated upon changes in said condition irrespective of the actual value of the condition, a second current controlling mechanism mechanically and electrically independent of the first current controlling mechanism, and means to operate the second current controlling mechanism including a member positively connected to said actuator whereby said second current controlling mechanism is always operated at the same value of said condition.

27. In a system of the class described, a motor, a relay controlling the operation of said motor, said relay comprising a pair of relay coils, means for causing rotation of said motor in one direction when one relay coil is more highly energized than the other and for causing rotation of said motor in the other direction when the other relay coil is more highly energized than said one relay coil, a balancing potentiometer connected to said relay coils for controlling the energization thereof and operated by said motor in a direction to rebalance the energization of the relay coils, a condition responsive device movable between a pair of spaced contacts in response to variations in a condition being controlled, means responsive to engagement of said condition responsive device and one of said contacts for substantially short-circuiting one of said relay coils for moving the motor in one direction to an extreme position, means responsive to engagement of said condition responsive device and the other of said contacts for substantially short-circuiting the other of said relay coils for moving the motor in the other direction to an extreme position, and means including a second potentiometer connected to said relay coils for adjustably controlling the position at which the rebalancing potentiometer causes equal energization of the relay coils when the condition responsive means is intermediate said contacts.

ARTHUR C. GRANT.